United States Patent
Mills et al.

(10) Patent No.: US 9,936,357 B2
(45) Date of Patent: Apr. 3, 2018

(54) MOBILE DEVICE DETECTION AND TRACKING

(71) Applicant: BlueFox, Inc., Sunnyvale, CA (US)

(72) Inventors: Amanda Mills, Menlo Park, CA (US); Philippe Morin, Sunnyvale, CA (US); Guillaume Tenant de la Tour, Saratoga, CA (US); Thuong Ho, San Jose, CA (US); Jan Willem Korver, AC Utrecht (NL)

(73) Assignee: BLUEFOX, INC., Sunnyvale, CA (US)

( * ) Notice: Subject to any disclaimer, the term of this patent is extended or adjusted under 35 U.S.C. 154(b) by 0 days.

(21) Appl. No.: 15/426,945

(22) Filed: Feb. 7, 2017

(65) Prior Publication Data

US 2017/0150325 A1 May 25, 2017

Related U.S. Application Data

(63) Continuation-in-part of application No. 15/006,057, filed on Jan. 25, 2016, now Pat. No. 9,769,625.
(Continued)

(51) Int. Cl.
*H04W 24/00* (2009.01)
*H04W 4/04* (2009.01)
(Continued)

(52) U.S. Cl.
CPC ............... *H04W 4/04* (2013.01); *H04L 67/26* (2013.01); *H04W 4/06* (2013.01); *H04W 4/14* (2013.01);
(Continued)

(58) Field of Classification Search
CPC ............ H04W 4/04; H04W 4/14; H04L 67/26
(Continued)

(56) References Cited

U.S. PATENT DOCUMENTS 7,733,836 B2 6/2010 Huseth et al.
7,856,656 B1 12/2010 Kharvandikar et al.
(Continued)

FOREIGN PATENT DOCUMENTS

RU 2011127863 A 1/2013
RU 126862 U1 4/2013
(Continued)

OTHER PUBLICATIONS

International Search Report and Written Opinion dated Jun. 29, 2017, for International Patent Application No. PCT/US2017/017015, filed Feb. 8, 2017, 8 pages.
(Continued)

*Primary Examiner* — Amancio Gonzalez
(74) *Attorney, Agent, or Firm* — Perkins Coie LLP

(57) ABSTRACT

Disclosed is a technique for passively monitoring the number of guests in a rental property. Mobile device broadcasts intended for connecting the device to a wireless network contain information about that device. This information includes unique identifiers such as MAC addresses. Detecting these broadcasts and filtering out those devices that are expected enables a property owner to have a semi-accurate number of guests within their property without actually being at the property, or visibly observing the guests in an obtrusive fashion. Guests are able to enjoy themselves in privacy and the property owner is able to monitor the safety of their property.

19 Claims, 12 Drawing Sheets

Related U.S. Application Data

(60) Provisional application No. 62/107,193, filed on Jan. 23, 2015, provisional application No. 62/292,812, filed on Feb. 8, 2016.

(51) Int. Cl.

| | | |
|---|---|---|
| *H04W 4/14* | (2009.01) | |
| *H04L 29/08* | (2006.01) | |
| *H04W 4/06* | (2009.01) | |
| *H04W 12/08* | (2009.01) | |
| *H04L 29/06* | (2006.01) | |
| *H04W 12/12* | (2009.01) | |

(52) U.S. Cl.
CPC ......... *H04W 12/08* (2013.01); *H04L 63/1425* (2013.01); *H04W 12/12* (2013.01)

(58) Field of Classification Search
USPC ...................................................... 455/456.3
See application file for complete search history.

(56) References Cited

U.S. PATENT DOCUMENTS

| | | |
|---|---|---|
| 9,344,992 B2 | 5/2016 | Noonan et al. |
| 2008/0067244 A1* | 3/2008 | Marks .................... G01V 15/00 235/385 |
| 2012/0190325 A1 | 7/2012 | Suhayya et al. |
| 2013/0290200 A1 | 10/2013 | Singhal et al. |
| 2014/0195380 A1 | 7/2014 | Jamtgaard et al. |
| 2015/0025937 A1 | 1/2015 | Turner, Jr. |
| 2016/0110833 A1* | 4/2016 | Fix ........................ G06Q 50/265 705/324 |
| 2016/0219411 A1 | 7/2016 | Tenant de la Tour et al. |
| 2016/0286624 A1 | 9/2016 | Patel et al. |
| 2017/0148063 A1 | 5/2017 | Ung et al. |

FOREIGN PATENT DOCUMENTS

| | | |
|---|---|---|
| WO | 2014035307 A1 | 3/2014 |
| WO | 2014035308 A1 | 3/2014 |

OTHER PUBLICATIONS

Corrected Notice of Allowance dated Aug. 8, 2017 for U.S. Appl. No. 15/006,057 of Tenant de la Tour, G., et al., filed Jan. 25, 2016.
Notice of Allowance dated May 24, 2017 for U.S. Appl. No. 15/006,057 of Tenant de la Tour, G., et al., filed Jan. 25, 2016.
U.S. Appl. No. 15/006,057 of Tenant de la Tour, G. et al. filed Jan. 25, 2016.
**International Search Report and Written Opinion dated Mar. 30, 2017, for International Application No. PCT/US2017/17018, 5 pages.
**Non-Final Office Action dated Feb. 2, 2017 for U.S. Appl. No. 15/006,057 of Tenant de la Tour, G., et al., filed Jan. 25, 2016.
**U.S. Appl. No. 15/426,953 of Ung, H. et al. filed Feb. 7, 2017.

* cited by examiner

MOBILE DEVICE DETECTION AND TRACKING

CLAIM FOR PRIORITY

The presently filed application is a continuation-in part application of U.S. patent application Ser. No. 15/006,057 entitled "Mobile Device Detection and Tracking," filed Jan. 25, 2016, which claims priority to U.S. Provisional Application No. 62/107,193, entitled "System and Method for Managing Digital Display Systems," filed Jan. 23, 2015; and U.S. Provisional Application No. 62/292,812, entitled "Mobile Device Detection and Tracking," filed Feb. 8, 2016, all of which are incorporated by reference herein in their entirety.

TECHNICAL FIELD

Teachings relate to electronic data management and more specifically, but not exclusively, to unobtrusively tracking mobile devices without installed applications or opt-in applications.

BACKGROUND

Bed and breakfasts, condos, time shares, and other rental properties have an issue with unauthorized parties. Property owners often do not have a close relationship with their guests and renters, but in order to conduct a business must extend trust of their property anyway. Sometimes guests take advantage of that trust and invite unauthorized individuals to come onto the property, causing physical damage to the property or reputational damage with neighbors and police. Owners wish to mitigate property damage, though in a way that respects the privacy of their guests without overburdening management at a given property.

DETAILED DESCRIPTION

Disclosed herein is a technique to help property owners monitor their property in a way that respects the privacy of their guests without overburdening management. In order to achieve these goals, the technique involves the use of a device that counts the local number of wireless/mobile devices and reports this number to a master device. Further, thresholds may be set up to trigger notifications (such as push or SMS). Settings for the device can be handled by the master device (e.g, a mobile phone including a paired application).

Mobile devices such as cellular phones, tablets, or other portable networked devices emit signals in Bluetooth, WiFi, and cellular (i.e. 2G, 3G, 4G, Edge, H+, etc.). These signals attempt to connect to paired devices, hotspots, cell towers, or other suitable wireless connection points to greater networks ("hotspots"). In order to connect to hotspots, mobile devices send out identifying data to establish a connection.

If the mobile device is tricked into attempting to connect with a network transceiver disguised as a hotspot, the fake hotspot may unobtrusively collect the identification data of the mobile device and then reject the connection request. The fake hotspot collects data in real-time on the mobile device, and by association, collects data regarding the human carrying the mobile device. This data collection occurs without alerting or impeding the human carrier. The system uses analytical software to determine, for example, an approaching unique ID user's presence, history, frequency of visits, duration of presence, and so on. The type of data available to the fake hotspots varies based on a number of details, such as the kind of hotspot used.

Figure 1:
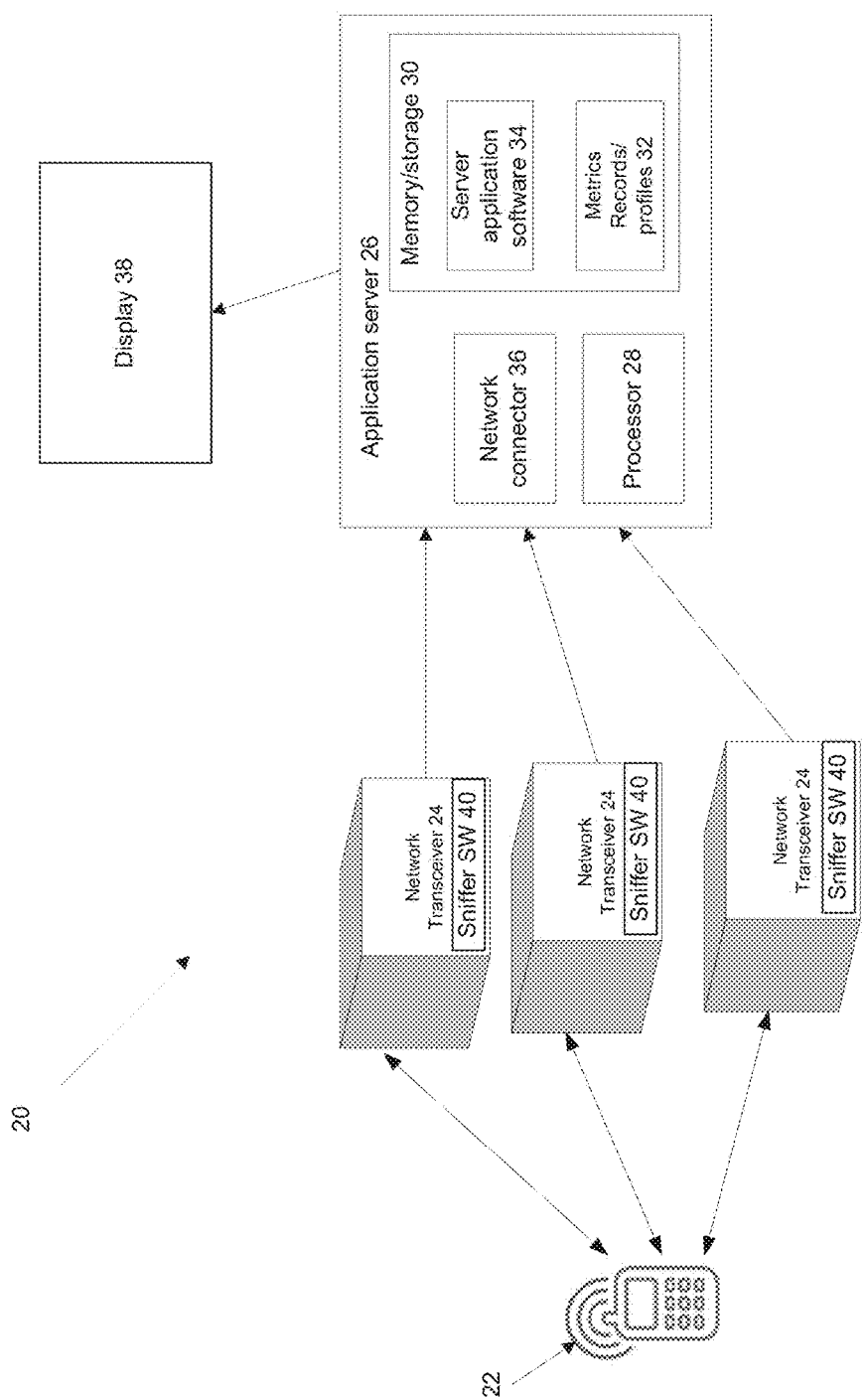
FIG. 1 is an exemplary top-level block diagram illustrating an embodiment of a mobile detection system.

FIG. 1 is an exemplary top-level block diagram illustrating an embodiment of mobile detection system 20. The system 20 relates to mobile devices 22 carried on a user's person. The mobile devices 22 are detected by network transceivers 24. Network transceivers 24 are detection devices or mobile stations (MS), which colloquially can be referred to as fake hotspots or sniffers, that collect identification data from mobile devices 22. Data collected by the network transceivers 24 is forwarded to an application server 26 via the Internet. The application server 26 includes a processor 28 and a data storage or memory 30 for logging metrics 32 and running application analytical software 34. The results of the analysis of metrics 32 are displayed or rendered to a user on a display 38.

In some embodiments, a dashboard selects and controls data that is received from the network transceivers 24 at the application server 26. The dashboard can control, from a distance, data captured by the network transceivers 24 as well as new visitor characteristics, history of data used, the number of mobile devices that can be sensed, demographics regarding a selected user, and so on.

The network transceivers 24 may include a plurality of sensors and communicative devices. Examples include wireless fidelity (WiFi) sensors, cell signal 2G, and Femto sensors for 3G and 4G for sensing a user's mobile device 22.

Mobile devices 22 emit WiFi signals automatically. WiFi signals carry identifying data including the MAC address (unique ID number), power of the signal, distance of mobile device 22 from the network transceiver 24, brand of the mobile device 22, name of the mobile device 22 (given by the user), and the network name the mobile device 22 used to connect.

Cell signals (2G, 3G, 4G, etc.) emitted by a phone also occur automatically. The network transceivers 24 detect this signal with an active action on a regular basis to collect the MAC address (unique ID number), SIM card number (IMSI), power of the signal, distance of mobile device 22 from network transceiver 24, carrier, nationality of the mobile device 22, list of applications which attempt to update, and the addresses of the web pages already open (or cached) on the mobile device 22.

Cell signal in this case refers to both CDMA and GSM type networks. While normally CDMA networks would not necessarily use mobile devices 22 with SIM cards, SIM cards exist in devices that use 4G LTE signals. Additionally, in the U.S., CDMA carriers use network-based whitelists to verify their subscribers. The mobile device 22 will still have a unique ID for the carrier to use for identification.

FIG. 1 includes three network transceivers 24. In order to locate the location of a given mobile device 22, knowing the distance between the desired location and three known locations enables a triangulation calculation to determine the desired location. To triangulate, a minimum of three fake hotspots is required. In practice, a user may want additional fake hotspots scattered throughout a given area or building to improve coverage or accuracy. At the time of this disclosure, lower quality network transceiver sensors have a roughly 150 foot range. As the cost of components changes with time, the optimal density of network transceivers 24 required to balance the effectiveness and cost within a bounded area/building would vary.

The network transceivers may additionally include processors 28 for internal operations and/or for accepting some of the analytical processing load from the application server 26. Network transceivers 24 may also employ sniffer software 40. Sniffer software 40 includes program operations of the network transceivers 24 as well as network protocol software. Examples of network protocol software include adaptations of OpenBTS (Open Base Transceiver System) and OpenBSC (Open Base Station Controller), with additional features as taught herein. OpenBTS is stable, more complete for GSM, and has a release for UMTS (Universal Mobile Telecommunications System). OpenBTS includes the functionality to perform complete man-in-the-middle attacks. It is worth noting that OpenBSC makes use of OpenBTS for its BTS functionalities.

Using OpenBTS software, examples of base model hardware that may be used for the network transceiver are adaptations of communications platforms manufactured by Ettus Research, Fairwaves, and Nuand.

Figure 8:
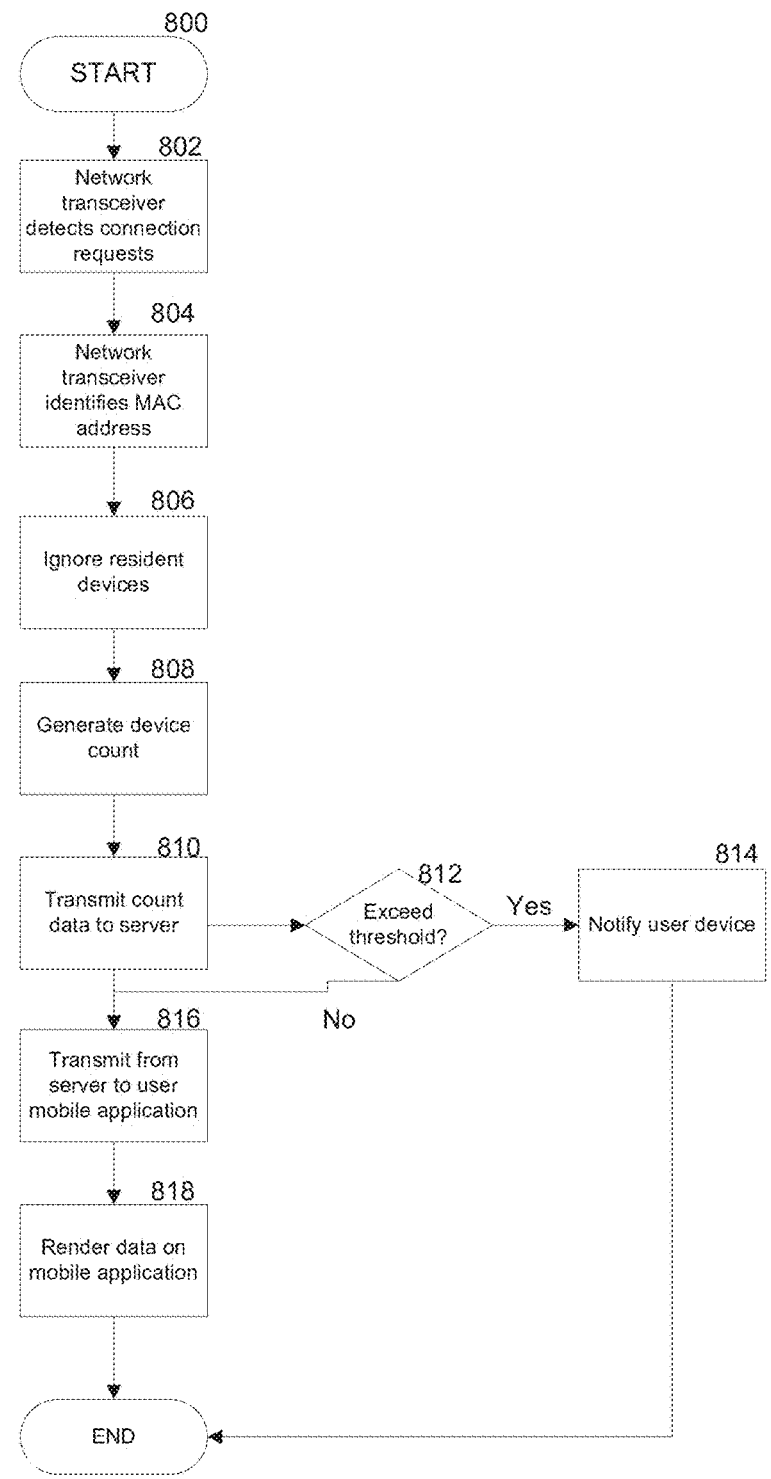
FIG. 8 is a flowchart illustrating a method for visitor counting.

The WiFi sniffer software 40 exists on a WiFi card. This sniffer software 40 configures the WiFi adapter into a monitor mode and displays continuously without any treatment or interruption. All the MAC addresses and RSSI values of mobile devices 22 are detected and no data is thrown away. A pattern length corresponds to the quantity of signals captured by the WiFi adapter. The curve representing the RSSI values of these signals is shown in FIG. 8. There is a variation in the signal strength over a given time (less than a second); however, when the sniffer software 40 is configured to check every millisecond, the network transceiver 24 captures the majority of the signal emitted by the mobile devices 22.

Some phone brands (ex: Apple) use a randomized MAC address. They will provide a number of fake MAC addresses along with the real one in an attempt to hide the real number. However, the random MAC addresses change whereas the real one does not. A data filter compares the MAC address for a given mobile device received over a plurality of network connection requests and removes device ID numbers which do not appear repeatedly. Consistent existence of a particular MAC address signifies a real address.

For cellular signals, there are two distinguishable cases: idle mode and non-idle mode. In idle mode, the mobile device 22 performs the selection and re-selection of a base station to make sure that the mobile device 22 is attached with the best possible channel to the carrier network. In non-idle mode, a mobile device 22, with a point-to-point active call, will perform a base station handover to assure that the call is not dropped.

In order for the mobile device 22 to choose to identify itself to the network transceivers 24, the mobile device 22 has to reselect the cell managed by the network transceivers 24 and push them to identify/authenticate. A set of criteria is defined in the standard mobile phone regarding this selection/re-selection procedure. A BCCH frequency scan can be described as follows: the mobile device 22 scans a set of frequencies to detect a BCCH frequency to camp on. Criteria for cell eligibility can be selected or re-selected. These cells include timing information. In some embodiments, every five seconds, the network transceiver 24 calculates the parameters for the serving cell and for non-serving cells.

GSM, UTRAN, and/or LTE (2G, 3G, 4G) cell reselection is feasible. Therefore, within the sniffer software 40 are programmed, unique approaches for each. According to the network requests, a network transceiver 24 provides specific identification parameters to a fake network (e.g., IMSI or IMEI). The network initiates the identification procedure by transferring an IDENTITY REQUEST message to the network transceiver 24 and starts a timer T3270. The IDENTITY REQUEST message specifies the requested identification parameters in the identity type information element. The IMSI and/or IMEI may be requested.

In some embodiments, the data network includes a wired data network and/or any category of conventional wireless communication networks; for example, radio, Wireless Fidelity (WiFi), cellular, satellite, and broadcasting networks. Exemplary suitable wireless communication technologies include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT), and others.

The sensors can acquire data on the media access control (MAC address), signal strength, timestamp of probes received, and so on, from the mobile device. In some embodiments, the sensors can be integrated into the display device and/or placed as a separate unit collecting data metrics per location and uploading them to the central server. Additional sensors improve the accuracy of the wireless metrics as well as cover multiple areas within a location. Other sensors that can be used include Bluetooth, GSM/2G, and so on.

Figure 2:
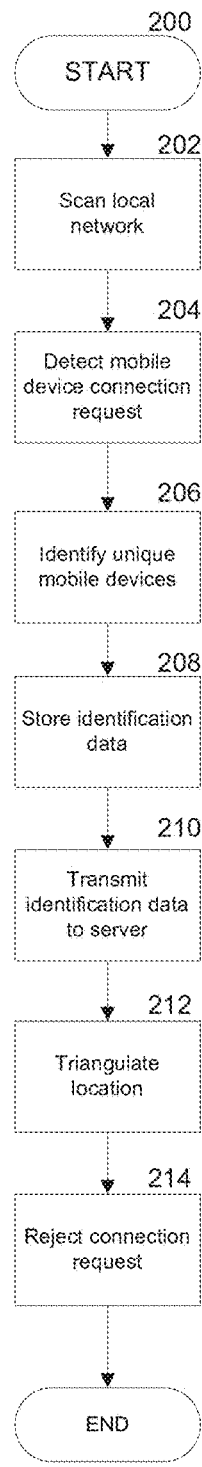
FIG. 2 is a flowchart illustrating a method of detecting a mobile device.

FIG. 2 is a flowchart illustrating a method of detecting a mobile device. In step 202, when turned on, the sniffer software 40 scans different frequencies (WiFi, Cellular, etc.) and collects the information broadcasted from the different PLMN's (Public Land Mobile Networks) cells, including the adjacent cells. The network transceivers 24 will also use this phase to take the necessary measurements to determine constants.

In step 204, the sniffer software 40 periodically catches all the IDs of the local mobile devices 22 in the zone of activity for the network transceiver 24. The period is identified by a CATCHER_PERIOD and is determined based on experimental measurements (e.g., number of active PLMNs and corresponding cell characteristics in the zone of activity). Broadcast for a duration CATCHE_DURATION_PER_PLMN BCCH information is on a frequency adjacent to the GSM range. The power of transmission CATCHER_TRANSMIT_POWER_PER_PLMN is computed with precision based on the collected information.

In step 206, a radio resource (RR) connection with each mobile station attached to the current PLMN requests identification. The different mobile devices 22 respond with the requested IDs: TMSI, IMSI, and/or IMEI. In step 208, the collected IDs are stored, and in step 210, the IDs of mobile devices 22 are transmitted to the application level and the application server 26.

In step 212, based on the communication between the mobile device 22 and the network transceivers 24, the mobile device's location is triangulated. In step 214, the network transceiver 24 terminates the RR connections requesting that mobile devices 22 return to the previous BCCH.

Figure 3:
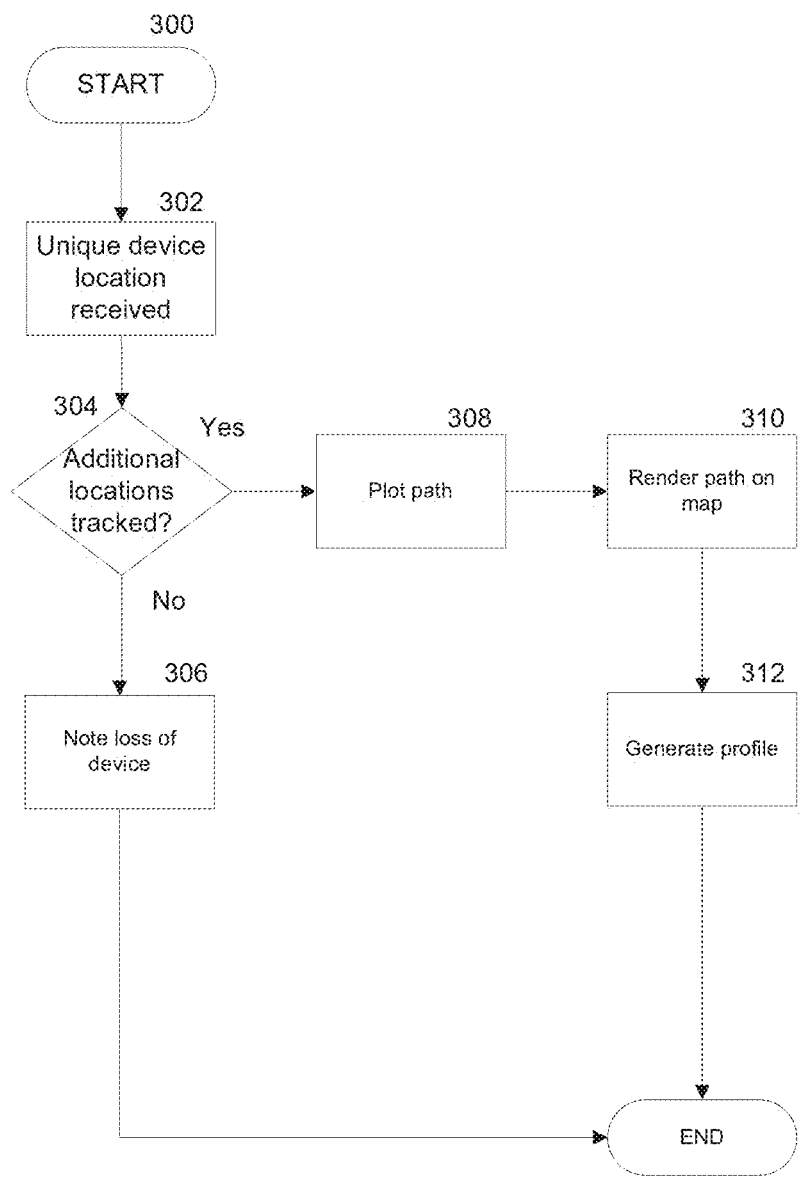
FIG. 3 is a flowchart illustrating a method of tracking a mobile device.

FIG. 3 is a flowchart illustrating a method of tracking a mobile device. In step 302, a first data set from the method of FIG. 2 is collected by the sniffer software 40 and/or the server's application software 34. Then, in step 304, the software 40 determines whether or not additional locations are tracked for the same mobile device 22 (cycling through some of the steps of FIG. 2 over again). The determination of whether or not the same device is discovered is through comparison of the identification data received in repeated cycles of the method of FIG. 2.

In step 306, if the given mobile device 22 is no longer detected, the software 34 notes the loss of the mobile device. In step 308, if the given mobile device 22 remains in contact, the multiple locations are plotted as a path. If the mobile device 22 has not moved, the path includes a wait time or a "mill around in substantially the same area time."

In step 310, the path is rendered on a map of the area supported by the network transceivers 24. In step 312, a profile is generated for that given mobile device's ID information. The profile may include data such as: average visit duration (recent and historical), average dwell time, bypassing traffic, path taken, and new versus recurring visitors (recent and historical).

In some embodiments, the sensors report recent metrics 32 for the approaching user back to the central server 26. Advantageously, movement of the approaching user can be determined, for example, using MAC readings and calculating the distance to a selected sensor, taking into account the signal strength of a particular reading. Low signal strength readings can be filtered to reduce noise.

The central server 26 can include one or more probe controllers and/or location controllers (not shown). The probe controllers process the aggregate information from all network transceivers 24 and image capturing devices (not shown). The location controllers provide analytics for back-end historical data as well as end-point data for real-time, recurring visitor decisions. Readings can be stored in a database using any conventional data mapping methods. For example, readings stored include, but are not limited to, signal strength (e.g., received signal strength indication (RSSI)), timestamp, location ID, International Mobile Station Equipment Identity (IMEI), gender, attention time, timestamp, age, and proximity readings.

In some embodiments, the central server 26 provides a dashboard to enable secured access for an administrator. For example, HTTP secure connections can be used, and transport layer security/secure sockets layers can be used to provide authenticated access to the administrator. Additionally and/or alternatively, two-factor authentication can be used to provide a token and/or password to the administrator.

Once the administrator is authorized, the dashboard allows the administrator to select and control the data that is received at the central server 26. The administrator can access the dashboard at the central server 26 or through the data network.

Figure 4:
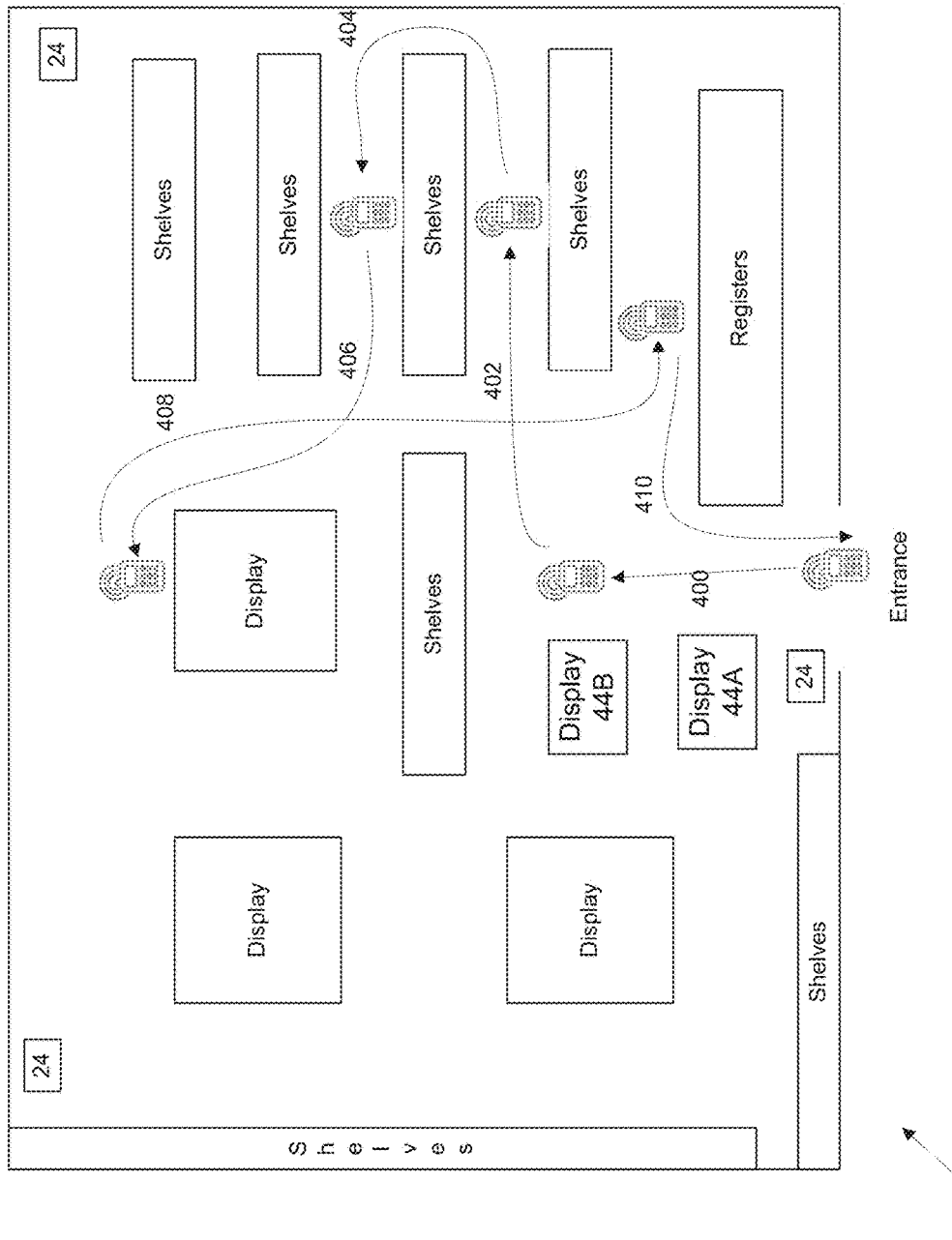
FIG. 4 is an exemplary sequence diagram tracking a mobile device through a store.

FIG. 4 is an exemplary sequence diagram tracking a mobile device through a store. The technology of analyzing people in real-time can be used as an efficient communication strategy in public environments (e.g., in corporate and campus locations). For example, organizations can adjust advertisements through collected metrics and analytic data.

In some embodiments, additional sensors are integrated into the system 20 to increase the number of metrics collected. Metrics are combined with advanced indexing and search algorithms, aggregations, and stochastics in order to provide the most complete insight into real-time audience demographics.

The exemplary process details providing analytics based on the real-time analysis of the proximate audience (e.g., approaching users, crowd, and so on). The central server 26 can determine if the approaching user is recurring or a "new visitor" based on aggregations of all the above-mentioned metrics. Stated in another way, the frequency of a user's visits is determined by creating a digital "footprint" of the user based on the metrics collected. In some embodiments, personal data is not stored, and the digital identifiers stored are associated with a particular MAC address. MAC addresses and devices can be aggregated based on a time slot (e.g., recent time slots include the last two minutes).

Each reading from the relevant time slot can be filtered by signal strength to determine mobile devices that are in actual proximity. These devices can be further filtered beginning from the current time slot and extending to an N-minute period after that (usually 24 hours in the past), which is in turn fully configurable. This can be used to determine whether a user is a recurring visitor. For additional security, digital identifiers can be encrypted and/or hashed.

Displayed in FIG. 4 is a building location 42. The building location 42 includes a number of network transceivers 24. The sequence steps 400-410 illustrate a single person's path through the store as mapped and rendered by the motion of their mobile device 22.

In sequence 400, the user enters the building location 42, goes straight past the first display 44A, and stops at the second display 44B. The analytic data derived from this can be that this one user of many was not interested in the display 44A. Instead, this user's interests were elsewhere.

In sequence steps 402 through 406, the user is tracked weaving through aisles. A marketer seeing this data can make determinations about the traffic flow in the store to potentially improve the natural routing of customers through the store. In sequence 408, the user has obtained what they intend to purchase and heads to the register, pays. In step 410 the user leaves.

The analytics also indicate how long the user spent at the register, and if they were in line, how the line was bunching up. This data can be used to further improve the orientation or management of the building location 42.

Figure 5:
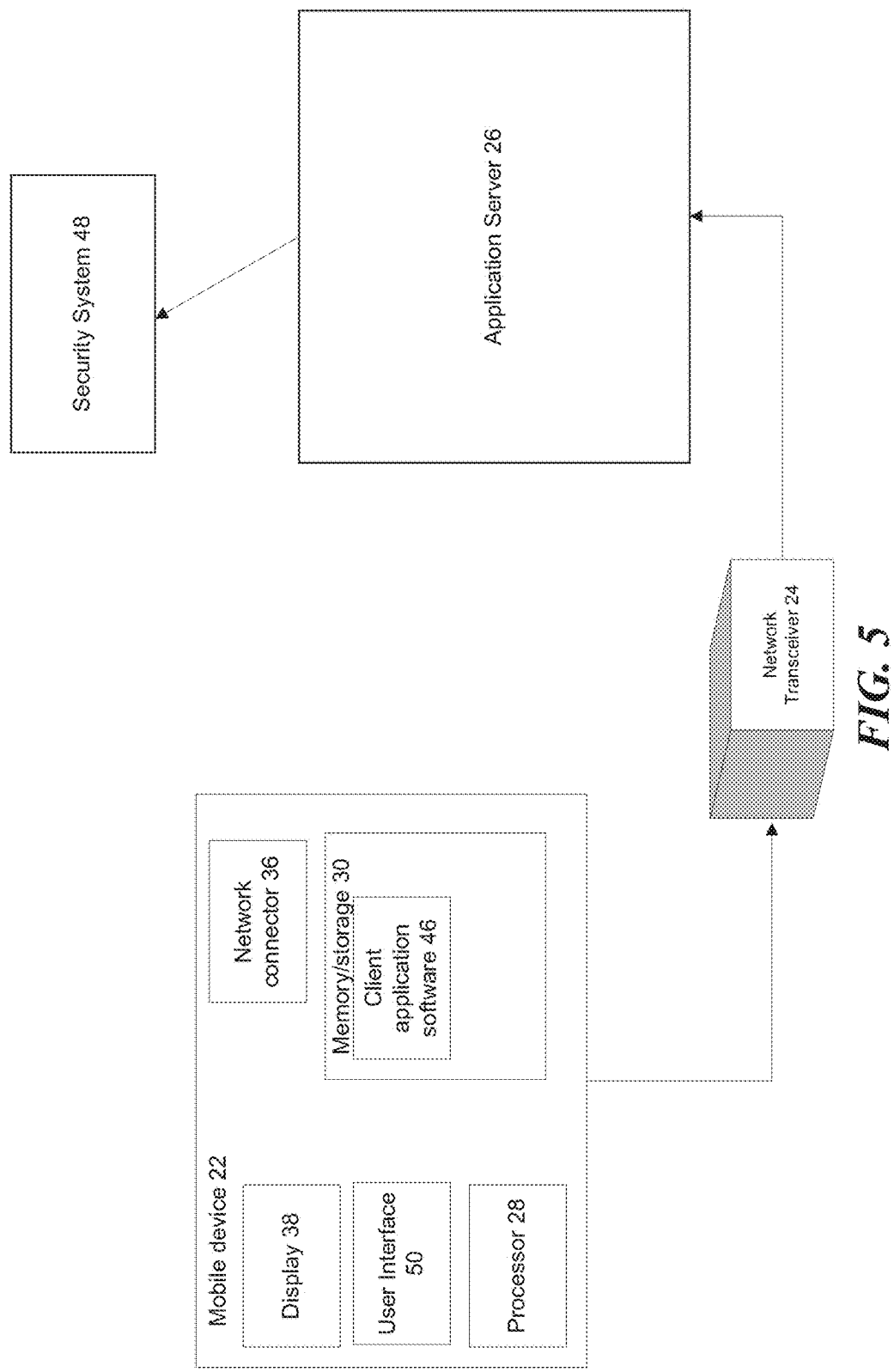
FIG. 5 is an exemplary top-level block diagram illustrating an embodiment of a mobile detection system integrated with a security system.

FIG. 5 is an exemplary top-level block diagram illustrating an embodiment of a mobile detection system integrated with a security system 48. Here, the mobile device 22 further includes installed client software 46. This embodiment differs from prior discussed embodiments where no such software was necessary in order for data to be collected. The client software 46 is not necessary for the security system 48 to work, but is one embodiment. What is necessary is that the security system is able to recognize whether the given mobile device 22 is associated with a given person or unknown through an IFF (identification friend or foe).

This can be done through a client application 46 programmed to embed the IFF data in the information that the user expects the network transceiver 24 to collect through the described "sniffing" process. As noted, the network transceivers 24 collect application names. The client application 46 is programmed to rename itself to a code which will be recognized as an IFF signal. Alternatively, the security system 48 may include a whitelist of MAC addresses, wherein no client application 46 is necessary, and the IFF signal is instead merely the MAC address.

Here, data collected in the application server 26 is analyzed, and directions are sent by the application server 26 to the security system 48 in order to cause security actions to occur (e.g., inform law enforcement, automatically lock doors, turn on lights, deliver messages, turn on cameras, activate traps, etc.).

Figure 6:
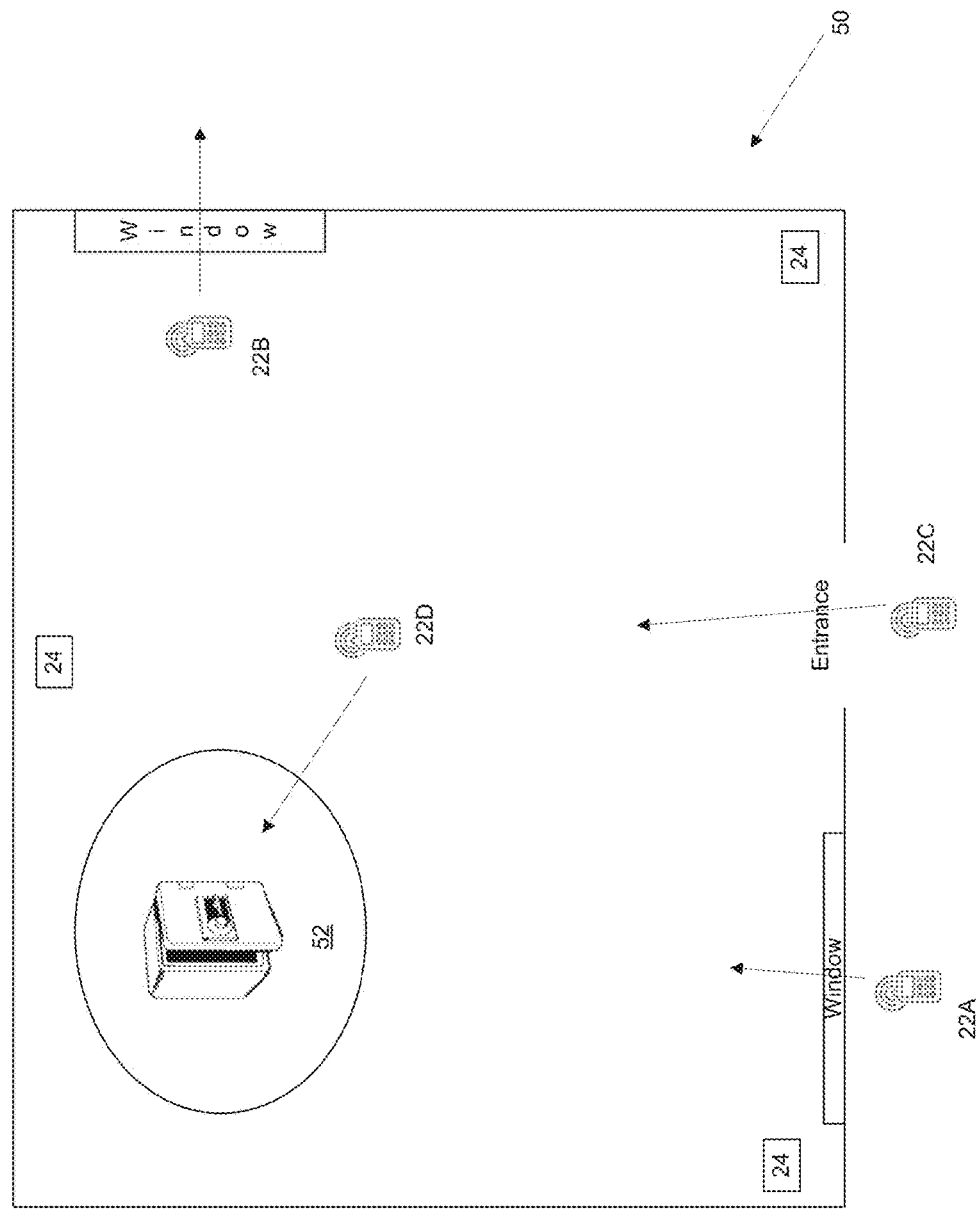
FIG. 6 is an illustrative implementation of a mobile device tracking system integrated with a security system.

FIG. 6 is an illustrative implementation of a mobile device tracking system integrated with a security system 48. Here, there is a user property 50. The user property may be any number of buildings: a domicile/house, an office building after hours, a bank, a military installation, or other region for which ingress and egress may be restricted. A number of sample stories are illustrated below for the technology addressed herein.

The mobile device 22A enters the user property 50 through a window. The velocity of the device 22A shows ingress instead of egress, implying possible unauthorized entry. The security system 48 may first check for an IFF signal, wherein the absence of the signal may trigger the system. In a domicile, this may be a burglar. The security system can capture the burglar's phone data, turn on security cameras, and call the police. Similar actions can be taken if an unknown device 22A is milling around outside the window.

The mobile device 22B leaves through a window. Similarly, in a domicile, this is not generally considered normal. Potentially, "little Timmy" is sneaking out when he should not be. In addition to the velocity of mobile device 22B, the time of day can be taken into account for such actions. Hypothetically, Timmy is allowed to leave through his window to get to his tree house during daylight, but not at 2:00 a.m. Here, even if an IFF signal is received, some other condition may override the IFF signal. Alternatively, IFF signals may not all be created equal. Mobile devices owned by Timmy's parents may not trigger the security system 48, while the mobile device 22B owned by Timmy does. In this circumstance, the security system 48 may send a text message to Timmy's parent's mobile devices, and the parents then head outside to confront the little miscreant.

The mobile device 22C enters straight through the front door of the user property 50. If the user property 50 is a business which should not be receiving visitors at 2:00 a.m., the security system 48 may be triggered. It is possible that the mobile device 22C has been previously tracked loitering around the user property 50 before. Upon that same device 22C approaching the main entrance, or any other entrance, the security system 48 is triggered.

The mobile device 22D is headed towards a valued zone 52. As before, an IFF signal may prevent the security system 48 from being triggered. Alternatively, without an IFF signal, and given a set of behavior/loitering in the valued zone 52, the security system 48 may trigger. Example actions include locking surrounding doors or dropping a cage trap over the valued zone 52, thereby sealing a thief in to await the authorities.

Figure 7:
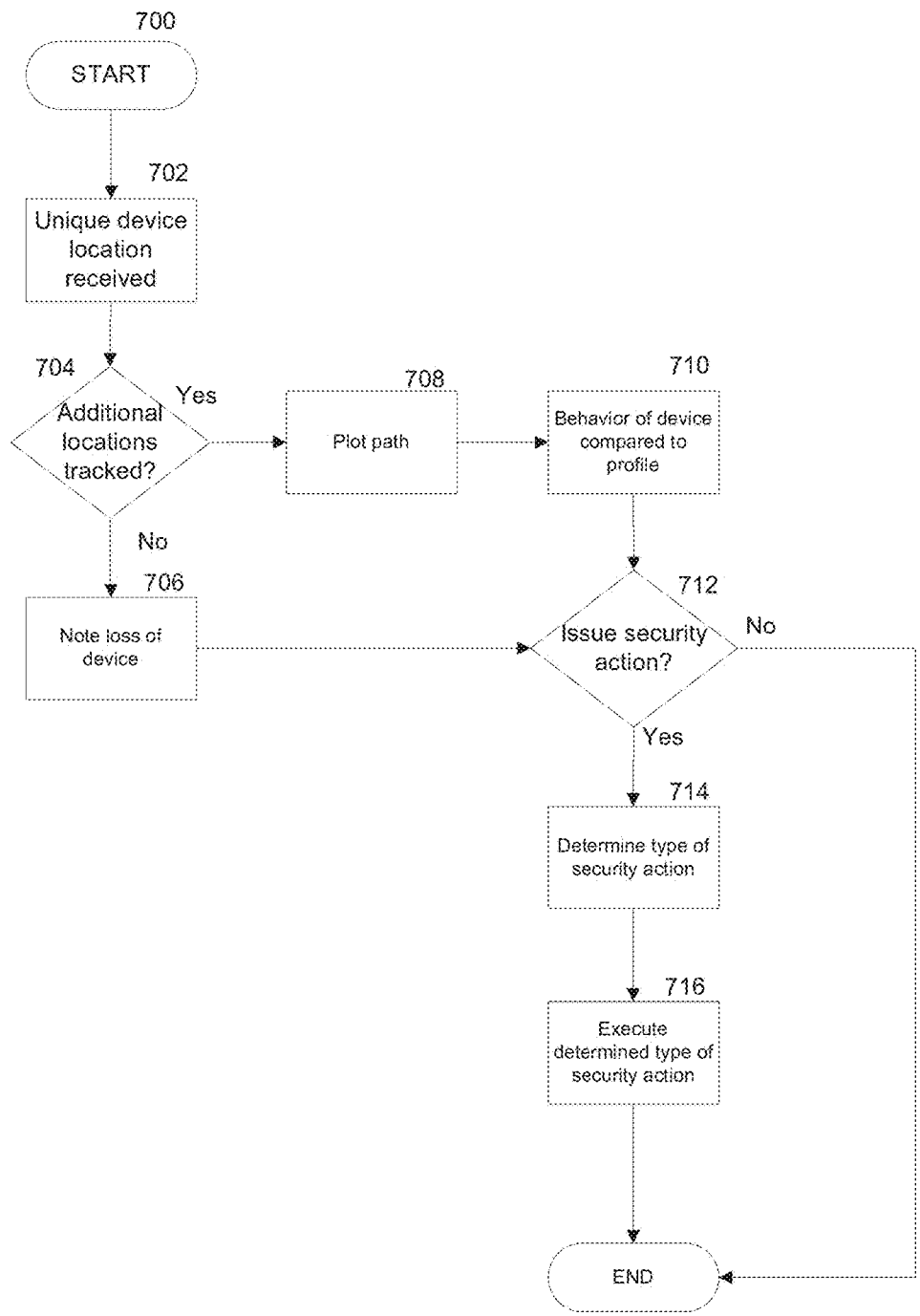
FIG. 7 is a flowchart illustrating a method of tracking a mobile device integrated with a security system.

FIG. 7 is a flowchart illustrating a method of tracking a mobile device integrated with a security system. Similar to FIG. 3, the network transceivers 24 collect one or more data points about the mobile devices 22 within range. In step 906, if a mobile device 22 suddenly vanishes from tracking that was expected to vanish based on predetermined security profiles, a potential security action may occur in step 712.

Alternatively, in step 710, a plotted path (both present and historical) of a mobile device 708 is compared to danger profiles. In step 712, if a danger profile appears to have been met, or if a mobile device 22 mysteriously vanished that shouldn't have, the security system 48 may trigger.

In step 714, if the security system 48 triggers, the system must determine an appropriate action. Actions are chosen based upon which danger profile was matched and what kind of user property 50 is being monitored. In step 716, the chosen action is executed by the security system 48.

A simple embodiment of the technique uses a single network transceiver 24 in a user property 50. The single transceiver 24 counts mobile devices 22 within range (and inside the user property 50). In such an embodiment, the network transceiver may alert a user that large numbers of mobile devices are present when perhaps they should not be. An example of such an occasion is in the rental property market. A property owner will rent out property and guests will come to stay in the property. In some cases, guests will invite a number of unauthorized individuals to enter the property (e.g., when throwing a party). Such circumstances can cause severe damage to the property. The damage may be physical or reputational (involving local law enforcement).

The effectiveness of tracking visitors depends largely on the visitors being unaware they are being tracked, or at the very least, unaware of the means employed to track them. The network transceiver 24 may be an unobtrusive black box with little to no markings in order to be inconspicuous. In some embodiments, the network transceiver 24 may connect to a local network (for communication to the application server 26) wirelessly in order to function while placed in a locked/hidden container, closet, or room.

FIG. 8 is a flowchart illustrating a method for visitor counting. In step 802, the network transceiver detects connection requests from mobile devices. This step proceeds similarly to the detection described in FIG. 2. The network requests may come over WiFi or other wireless networks (such as Bluetooth or cellular). In step 804, the network transceiver identifies unique device identifiers (such as a MAC address). In some embodiments, certain mobile devices will be ignored based on the unique identifier. In some embodiments, some devices with low RSSI values may also be ignored.

In embodiments where the purpose is to track mobile phones, MAC addresses associated with manufacturers that do not manufacture mobile phones are ignored. Further, some manufacturers use the MAC address schema to assign identifiers. In those cases, the scheme may be used to determine whether or not a device is a mobile phone. The network transceiver uses schema related to known devices in order to interpret the identifier data being transmitted by local mobile devices. An example where this is relevant is where a guest brings both a mobile phone and a laptop to a rental property. Rather than have that guest appear as "two" guests, the network transceiver may be programmed to ignore the laptop.

For these steps, it is unnecessary for the network transceiver to store or keep the identifiers. The most important element of the step is to identify a number of unique guest devices based on an identifier. In step 806, the network transceiver ignores device identifiers associated with resident devices. Resident devices are devices that are always or nearly always detected by the network transceiver. There are a number of ways to filter for resident devices. One such way is to record the resident devices into the programming of the network transceiver (this may be achieved through the use of user application software) in order to generate an IFF list. Another way is to determine that a given device (as identified by a unique identifier) is a resident device is if that device is detected at a certain frequency (e.g., eight or more hours a day for a week). A third manner of ignoring resident devices is for the user to merely know how many resident devices there are and alter a setting to reduce the total device count by that number.

In step 808, once devices are counted and resident devices have been filtered out of count, the network transceiver has an accurate count of guest devices. In step 810, the network transceiver transmits the guest count to the web server. In some embodiments, steps 808 and 810 are reversed. Rather, the wireless communicator transmits the device identifiers to the web server, and the web server generates the device count. To address device privacy concerns, the actual device identifiers may be hashed prior to transmission to the web server such that the web server never has the actual device identifiers. In some embodiments, only a portion of the device identifier (MAC address) is hashed. For example, the portion of the MAC address that identifies a manufacturer may be left unchanged, while the unique device ID is hashed to protect visitor privacy. The identity of the manufacturer may be used to determine whether or not a given device is a mobile phone or some other type of wireless device (e.g., a laptop computer). Where a given manufacturer markets both mobile phones and other devices, other criteria may determine device type. For example, where a device maintains the same signal strength(RSSI) for long periods of time, it suggests the device is not moving, and thus is unlikely to be a mobile phone.

In step 812, the web server compares the count of guest devices to a threshold set by a user application. In step 814, where the threshold is exceeded, the web server sends a notification to a user application on a user device. This notification may include push notifications within a registered web application or text messages. Other notifications may include a trigger for an "internet-of-things" device such as a security camera or a security system. There may also be more than one threshold. For example, there may be one threshold for too many people, and another for none. A reason for having a zero threshold is for the owner to know when a rental property has become empty in order to facilitate the scheduling of cleaning services.

Separate from the threshold, in step 816, the web server transmits the guest count to a user application on a user device. In step 816, the user application renders the guest count on the user device. In this way, the user (property owner) may always check in on the number of guests (or guest devices) on their property through a GUI on a user device.

Figure 9:
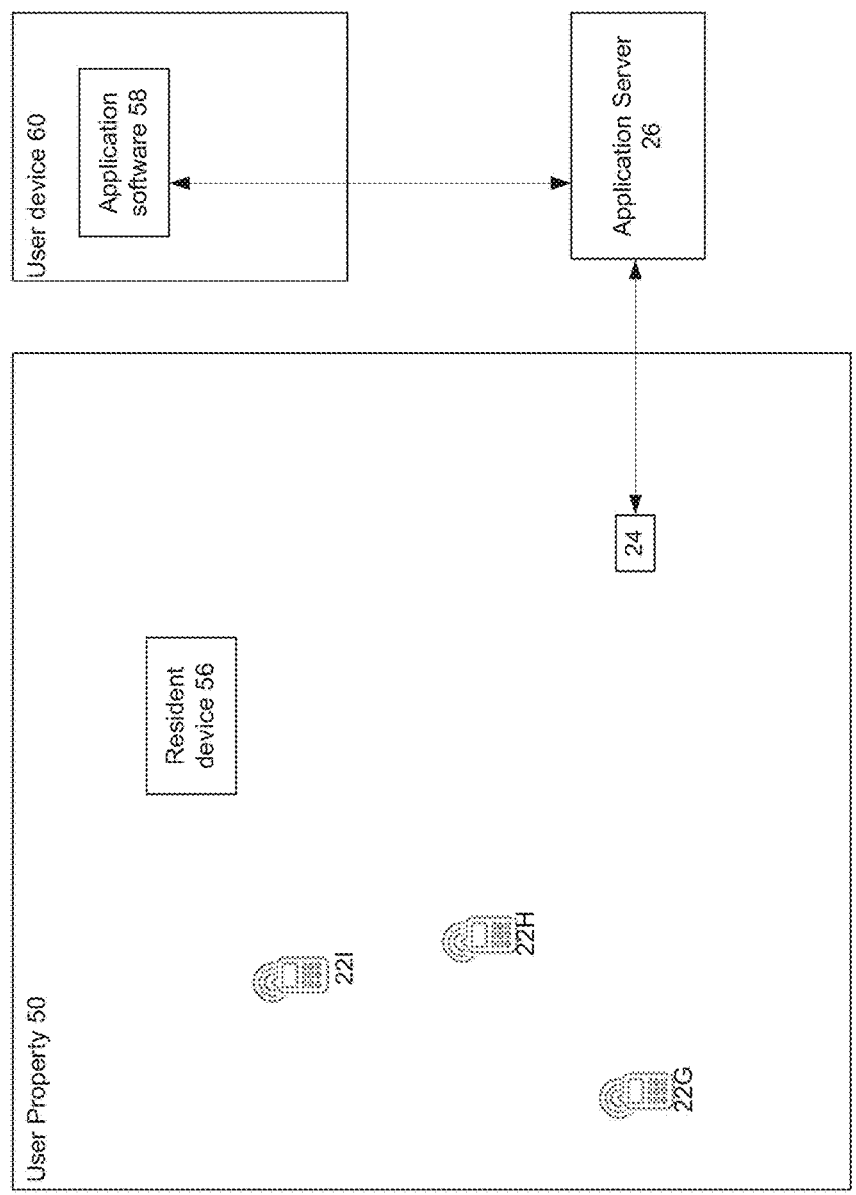
FIG. 9 is an illustration diagram of a visitor counting system in accordance with FIG. 8.
Figure 10:
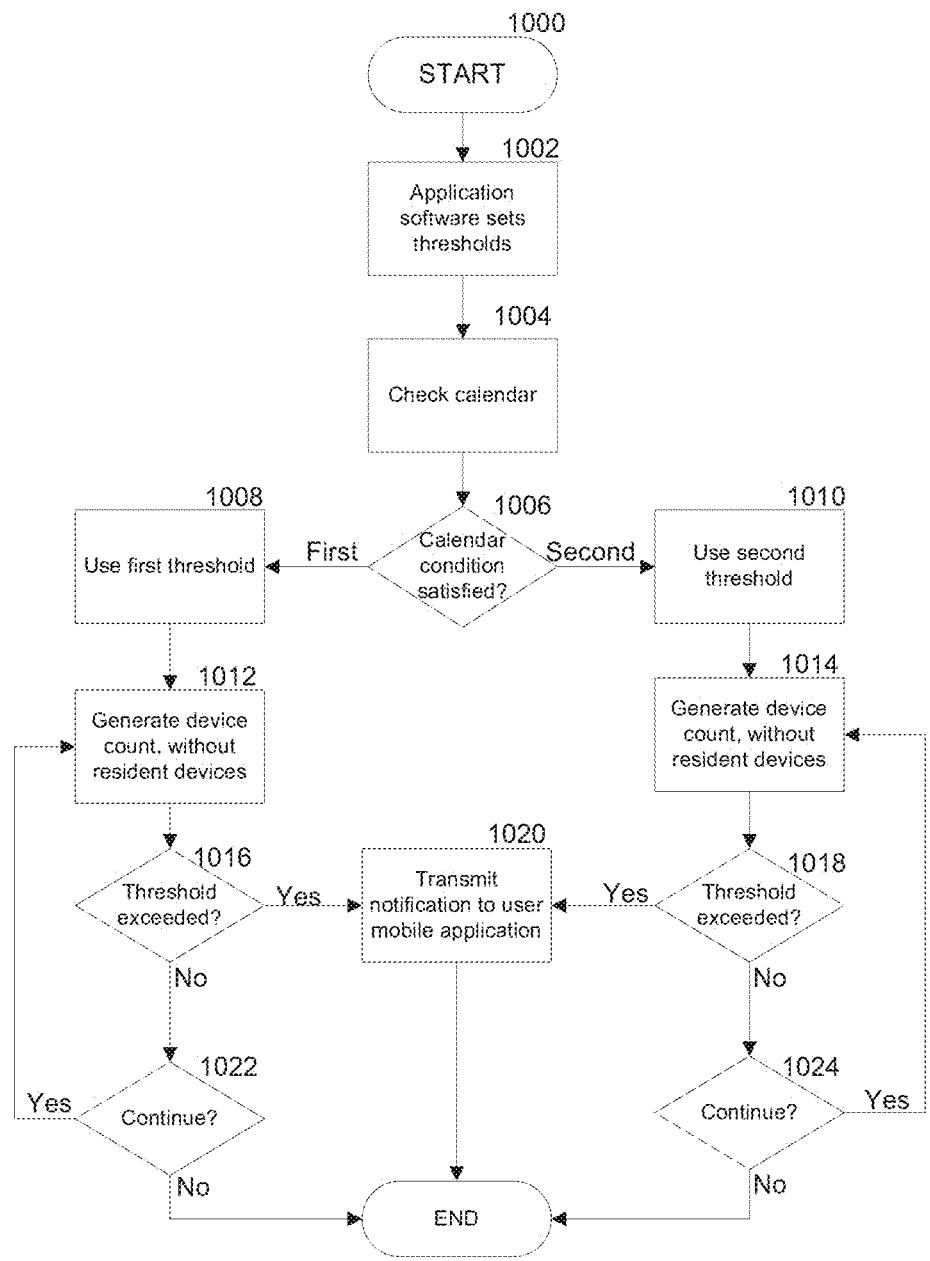
FIG. 10 is a flowchart illustrating a method for managing a visitor counting system with a calendar.

FIG. 9 is an illustration diagram of a visitor counting system in accordance with FIG. 10. The block diagram includes a user property 50 including a network transceiver 24. Depicted in the figure, the user property includes three mobile devices 22G-I and one resident device 56. The network transceiver 24 communicates with an application server 26. The application server 26 in turn communicates with a user's application software 58 on a user device 60.

The network transceiver 24 detects each of the three mobile devices 22G-I, as well as the resident device 56. The resident device 56 is ignored from the count that network transceiver 24 transmits and which eventually reaches the user device 60. Accordingly, the visitor count of FIG. 9 is three. There may be fewer or greater actual visitors at the user property 50, though "three" is an acceptable approximation. The application software 58 renders this count whenever requested by the user. The count is constantly updated as the network transceiver 24 informs the application server 26.

Where a threshold is established at "four," the addition of one more mobile device 22 will cause application server 26 to issue a notification to the application software 58 that the threshold has been exceeded. Conversely, if a threshold is established at "zero," when mobile devices 22G-I all leave the range of the network transceiver 24, and the network transceiver 24 informs the application server 26 of the new count, the application server 26 will transmit a notification to the user device 60.

In some embodiments, the user property 50 would include more than one network transceiver 24. Where the user property 50 is excessively large, such that the range of a single network transceiver 24 cannot service the entire user property 50, additional network transceivers 24 may be employed. In these embodiments, the network transceivers 24 add individually detected mobile devices 22 and filtering for unique device identifiers (e.g., MAC addresses) in order to determine a total visitor count.

FIG. 10 is a flowchart illustrating a method for managing a visitor counting system with a calendar. As previously discussed, the technique disclosed herein may include the use of multiple thresholds. The application software can configure each threshold to be active at a time determined by additional user input. The additional user input may be the use of an export calendar or an API providing a direct interface between the application software and rental management software. In this manner, calendar events may be used to configure the use of each threshold.

In step 1002, the application software sets a number of thresholds via user interaction with a GUI. The user inputs settings and conditions as to where each threshold would apply. Examples of calendar-based conditions include guest checking in, guest checking out, maid service arriving, scheduled empty, scheduled for owner use, and other suitable calendar-based distinctions known in the art. In step 1004, the application server examines the user inputted calendar. As previously described, the calendar may come from an upload or a direct communications interface between the application server of the visitor counting technique and another application server.

In step 1006, the application server determines if a first or second calendar condition is satisfied. In step 1008, where the first calendar condition is satisfied, the application server employs a first threshold. In step 1010, where the second calendar condition is satisfied, the application server employs a second threshold. In steps 1012 and 1014, the network transceiver establishes a device count ignoring resident devices. The device count occurs regardless of the threshold employed. In steps 1016 and 1018, the application server checks each respective visitor count against the employed threshold. In step 1020, where the threshold is exceeded, the application server forwards a notification to the user device.

For example, a user may have an upcoming reservation of their rental property. The property can accommodate six people. The user sets a threshold for the reservation time of lower than approximately six (the user may want to accommodate for multiple devices). When that reservation time arrives, the application server begins using the determined threshold for the reservation (approximately six).

When the calendar has a scheduled check out day, a new threshold may be generated. At this point, the user is interested in scheduling a maid service. Thus, a threshold of less than one lets the user know when the guests have cleared out. In this manner, the user may then call the maid service to go and clean.

A third threshold may be established based on multiple conditions. Those conditions may be: (1) the calendar indicates a check out day and (2) the "less than 1" threshold has already been triggered that day. Using these two conditions, the application server may set up a third threshold for the cleaning staff (e.g., greater than 3). A fourth threshold may be similarly established, based on: (1) the calendar indicates a check out day and (2) the "cleaning staff" threshold has already been triggered that day, thus the application server establishes a fourth threshold for an empty property (e.g., greater than zero) that watches for burglars.

Figure 11:
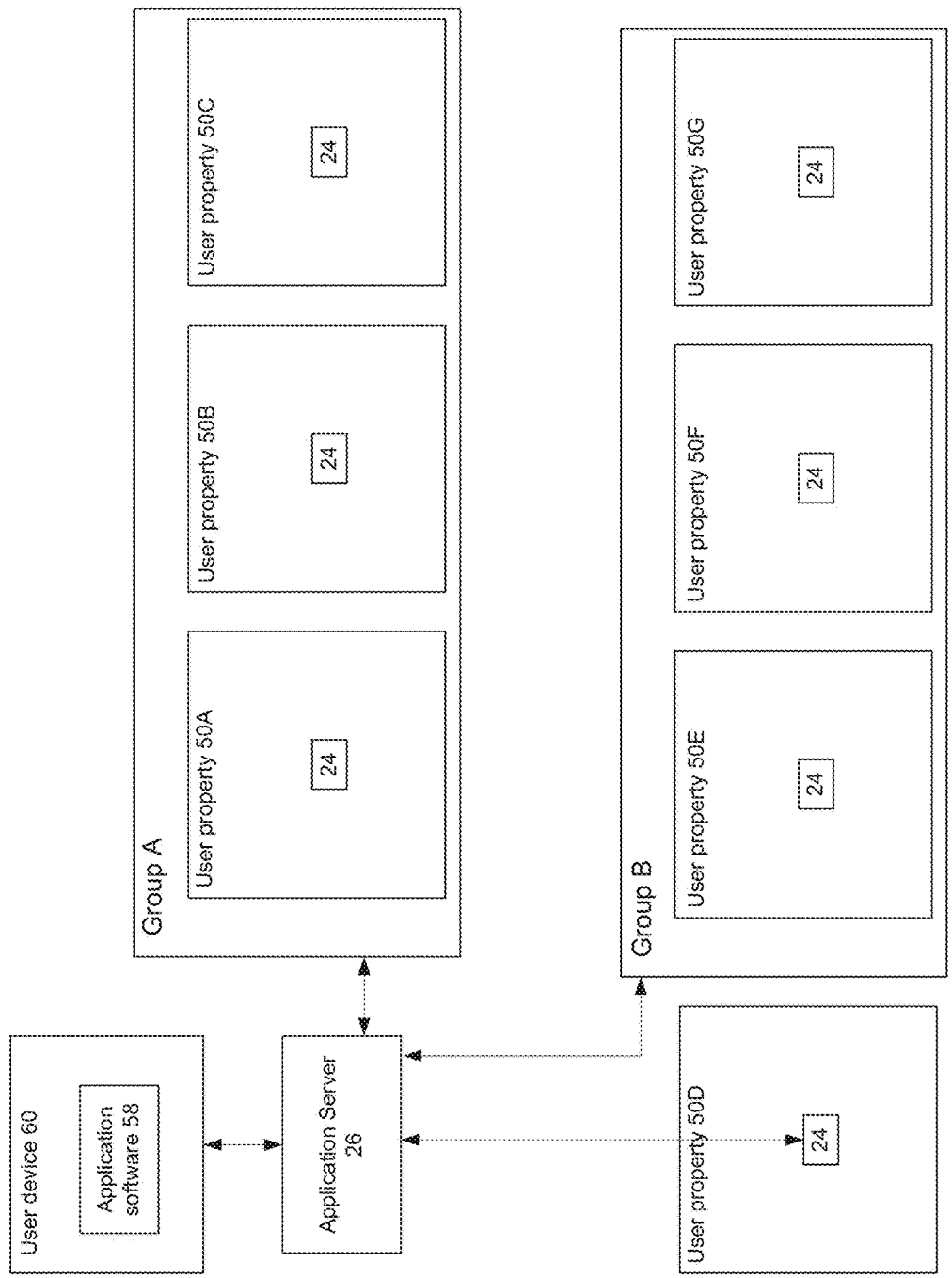
FIG. 11 is an illustration of a system for managing numerous properties with an integrated system of visitor counters.

FIG. 11 is an illustration of a system for managing numerous properties with an integrated system of visitor counters. Depicted in FIG. 11 are a number of user properties 50A-G. The user properties are divided into three groups: Group A, Group B, and user property 50D (positioned alone). In some embodiments, a user owns a number of rental properties. Adjusting thresholds for a number of properties can be onerous. Thus, the application software 58 may control settings and configurations for multiple user properties at once via the application server 26.

Figure 12:
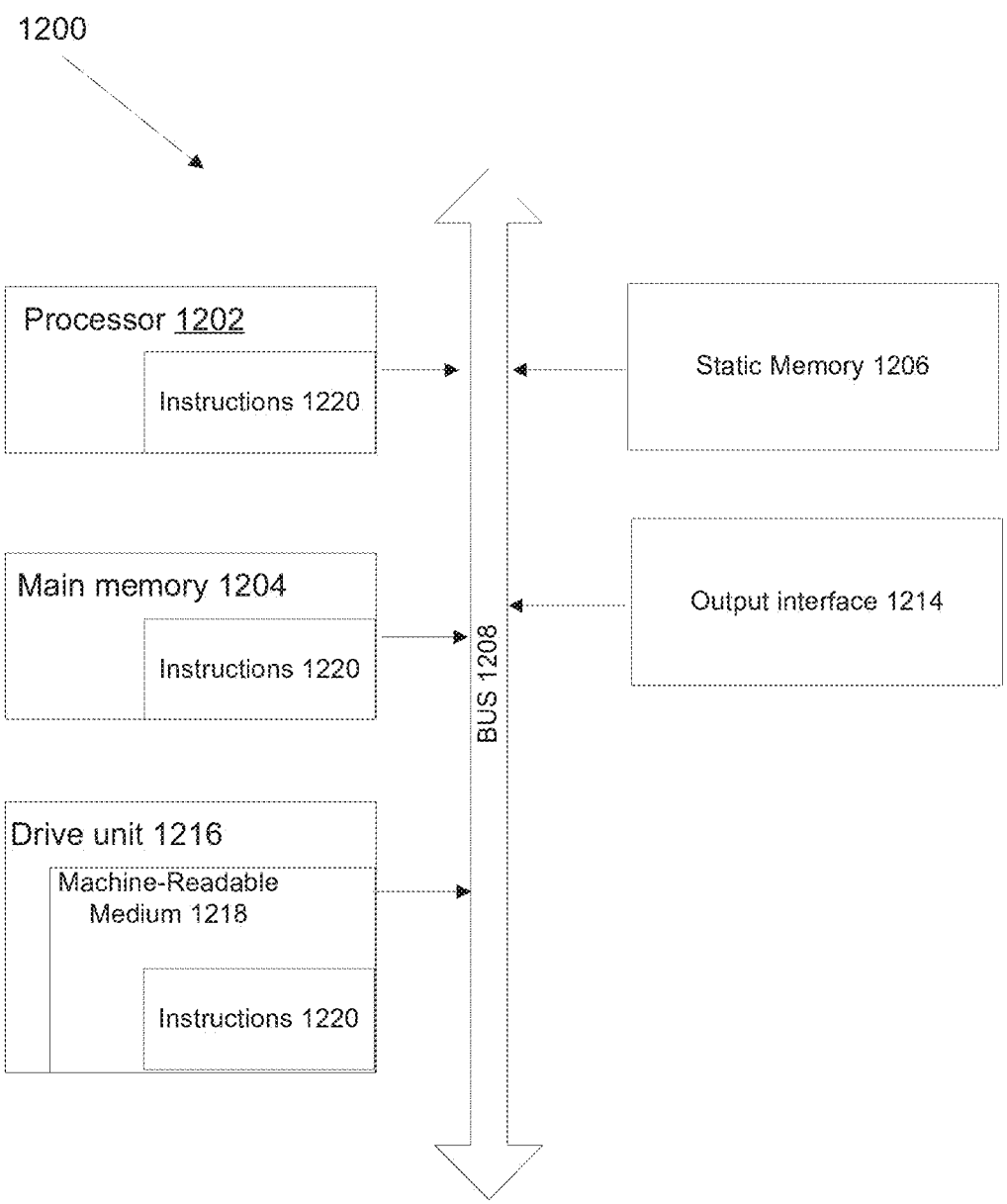
FIG. 12 is a block schematic diagram of a system in the exemplary form of a computer system within which a set of instructions for causing the system to perform any one of the foregoing methodologies and logical flows may be executed.

FIG. 12 is a block schematic diagram of a system in the exemplary form of a computer system 1400 within which a set of instructions for causing the system to perform any one of the foregoing methodologies and logical flows may be executed.

The computer system 1200 includes a processor 1202, a main memory 1204, and a static memory 1206, which communicate with each other via a bus 1208. The computer system 1200 also includes an output interface 1214; for example, a USB interface, a network interface, or electrical signal connections and/or contacts;

The disk drive unit 1216 includes a machine-readable medium 1218 upon which is stored a set of executable instructions, i.e., software 1220, embodying any one, or all, of the methodologies described herein. The software 1220 is also shown to reside, completely or at least partially, within the main memory 1204 and/or within the processor 1202.

The software 1220 may further be transmitted or received over a network by means of a network interface device 1214.

In contrast to the system 1200 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g., a computer. For example, a machine-readable medium includes read-only memory (ROM); random access memory (RAM); magnetic disk storage media; optical storage media; flash memory devices; electrical, optical, acoustical or other form of propagated signals such as carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations (e.g., requiring cables and complex software configurations, or requiring a consultant to install). For example, embodiments may provide one or more cloud computing solutions that enable users, e.g., users on the go, to access real-time video delivery on such internet-enabled or other network-enabled devices, servers, or clients in accordance with embodiments herein. It further should be appreciated that one or more cloud computing embodiments include real-time video delivery using mobile devices, tablets, and the like, as such devices are becoming standard consumer devices.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

The invention claimed is:

1. A method for monitoring a visitor count in a domicile and reporting the visitor count to a user comprising:
   detecting, by a wireless communicator, wireless device broadcasts from wireless devices, the wireless device broadcasts include a device identifier used to connect to wireless networks, wherein the device identifier of a given wireless device broadcast identifies a particular wireless device of the wireless devices;

communicating a number of unique device identifiers to a web server;
determining, by the web server, the number of unique device identifiers exceeds a predetermined threshold;
transmitting, by the web server, a notification to a user device indicating the predetermined threshold has been exceeded;
communicating, by the web server, the number of unique device identifiers to the user device; and
rendering, by a client application, on the user device the number of unique device identifiers.

2. The method of claim 1, further comprising:
broadcasting, by the wireless communicator, a signal causing nearby wireless devices to emit wireless device broadcasts.

3. The method of claim 1, further comprising:
identifying, from the device identifiers, a number of resident device identifiers associated with resident wireless devices, wherein the resident devices identifiers are those device identifiers that exceed a threshold for frequency of detection; and
reducing the number of unique device identifiers by the number of resident device identifiers.

4. The method of claim 1, further comprising:
receiving, by a mobile application, resident instructions including a number of resident devices;
transmitting, by the mobile application, to the web server the resident instructions; and
reducing the number of unique device identifiers by the number of resident devices.

5. The method of claim 1, further comprising:
transmitting, by the web server, a push notification or SMS message to the user device when the number of unique devices is below a threshold.

6. The method of claim 1, wherein the domicile is a rental property, and the wireless communicator is installed in the rental property.

7. The method of claim 6, further comprising
analyzing, by the web server, a rental calendar associated with the rental property for a current rental status; and
adjusting the predetermined threshold based on the current rental status.

8. The method of claim 1, wherein said detecting step further comprises:
determining, by the wireless communicator, a device type for each of the wireless devices based on a comparison of each device identifier to an identifier schema; and
ignoring all wireless devices that do not have the device type of "phone."

9. A method for monitoring a visitor count in a domicile and reporting the visitor count to a user comprising:
broadcasting, by a wireless communicator, a signal causing nearby wireless devices to emit wireless device broadcasts;
detecting, by the wireless communicator, wireless device broadcasts from the nearby wireless devices, the wireless device broadcasts include a device identifier used to connect to wireless networks, wherein the device identifier of a given wireless device broadcast identifies a particular wireless device of the wireless devices;
communicating a number of unique device identifiers to a web server; and
exposing, by the web server, the number of unique device identifiers to an application interface accessible via the Internet by an authorized device.

10. The method of claim 9, wherein the application interface is a mobile client application and the authorized device is a mobile user device, the method further comprising:
rendering, by the mobile client application, on the mobile user device the number of unique device identifiers.

11. The method of claim 9, wherein the domicile is a rental property, and the wireless communicator is installed in the rental property.

12. The method of claim 11, further comprising
analyzing, by the web server, a rental calendar associated with the rental property for a current rental status; and
adjusting the predetermined threshold based on the current rental status.

13. A system for monitoring a visitor count in a domicile and reporting the visitor count to a user comprising:
a wireless communicator configured to broadcast a signal causing nearby wireless devices to emit wireless device broadcasts and further configured to detect wireless device broadcasts from said nearby wireless devices, the wireless device broadcasts provide identifying data used to connect to a wireless network, wherein each of the wireless device broadcasts include a device identifier for a respective wireless device of the wireless devices, the wireless communicator further configured to count a number of unique device identifiers of wireless devices;
a mobile application including a user interface for the wireless communicator and user account settings;
a web server configured to receive the number of unique device identifiers of wireless devices from the wireless communicator over the Internet and compare the unique number of device identifiers to a threshold as determined by input from the mobile application, the web server further configured transmit data regarding the number of unique device identifiers of wireless devices to the mobile application.

14. The system of claim 13, wherein the mobile application is paired with the wireless communicator on a first user account stored at the web server.

15. A method for monitoring a visitor count across a number of rental properties and reporting the visitor count to a user comprising:
communicating, by a web server, with a plurality of wireless communicators over the Internet, wherein the plurality of wireless communicators are physically dispersed throughout the number of rental properties and each wireless communicator of the plurality of wireless communicators is associated with a particular rental property of the plurality of rental properties;
detecting, by a first wireless communicator, wireless device broadcasts from wireless devices, the wireless device broadcasts provide identifying data used to connect to a wireless network, wherein each of the wireless device broadcasts include a device identifier for a respective wireless device of the wireless devices, the first wireless communicator physically located within a first rental property;
communicating, by the first wireless communicator, a first visitor data to the web server, the first visitor data including a first number of unique device identifiers and a first rental property identifier; and
communicating, by the web server, the first visitor data to a user device; and
rendering, by a client application, on the user device the first number of unique device identifiers as associated with the first rental property.

16. The method of claim 15, further comprising:
communicating, by the client application, a visitor threshold for each of the plurality of rental properties;
determining, by the web server, the first number of unique device identifiers a first visitor threshold associated with the first rental property; and
transmitting, by the web server, a push notification or SMS message to the user device indicating the first threshold has been exceeded at the first rental property.

17. The method of claim 16, further comprising
analyzing, by the web server, a first rental calendar associated with the first rental property for a current rental status; and
adjusting the first visitor threshold based on the current rental status.

18. The method of claim 15, wherein said detecting step further comprises: determining, by the first wireless communicator, a device type for each of the wireless devices based on a comparison of each device identifier to an identifier schema; and ignoring all wireless devices that do not have the device type of "phone."

19. The method of claim 15, further comprising: identifying, by the first wireless communicator, a first number of resident device identifiers associated with resident wireless devices, wherein the resident devices identifiers are those device identifiers that exceed a threshold for frequency of detection; and reducing, by the first wireless communicator, the first number of unique device identifiers by the first number of resident device identifiers.

* * * * *